US009323096B2

United States Patent
Liu et al.

(10) Patent No.: US 9,323,096 B2
(45) Date of Patent: Apr. 26, 2016

(54) PIXEL UNIT, METHOD FOR FABRICATING THE SAME AND LIQUID CRYSTAL DISPLAY DEVICE

(75) Inventors: Sha Liu, Beijing (CN); Hebin Zhao, Beijing (CN); Seungmin Lee, Beijing (CN); Dan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 253 days.

(21) Appl. No.: 13/435,426

(22) Filed: Mar. 30, 2012

(65) Prior Publication Data
US 2012/0249403 A1  Oct. 4, 2012

(30) Foreign Application Priority Data

Mar. 31, 2011  (CN) .......................... 2011 1 0080376

(51) Int. Cl.
*G02F 1/1335* (2006.01)
*G02F 1/1343* (2006.01)
(Continued)

(52) U.S. Cl.
CPC .... *G02F 1/133512* (2013.01); *G02F 1/134309* (2013.01); *G02F 1/136209* (2013.01);
(Continued)

(58) Field of Classification Search
CPC ................... G02F 1/134363; G02F 1/134309;
G02F 2001/134345; G02F 2001/134372;
G02F 2201/40; G02F 1/1362; G02F 1/136209;
G02F 2001/13629; G02F 1/1343; G02F
2001/136218; G02F 1/133753; G02F
2201/122; G02F 1/133707; G02F
2201/134318; G02F 2001/134381; G02F
1/133371; G02F 2201/128; G02F
2001/133757; G02F 1/133512; G02F
1/134336; G02F 2001/133388; G02F
2201/124; G02F 2001/13338; G02F 2201/121;
G02F 2001/124
USPC .............. 349/110, 111, 139, 141; 345/55, 87, 345/103, 104
See application file for complete search history.

(56) References Cited

U.S. PATENT DOCUMENTS 6,327,014 B1 * 12/2001 Mulatier et al. ............... 349/143
7,679,712 B2 * 3/2010 Song et al. ..................... 349/156
(Continued)

FOREIGN PATENT DOCUMENTS

CN  101726953 A  6/2010
JP  08-146386 A  6/1996

OTHER PUBLICATIONS

First Chinese Office Action dated Mar. 26, 2014; Appln. No. 201110080376.4.
(Continued)

*Primary Examiner* — Michael Caley
*Assistant Examiner* — Angela Davison
(74) *Attorney, Agent, or Firm* — Ladas & Parry LLP (57) ABSTRACT

The disclosed technology is directed to a pixel unit and a method for manufacturing the same and a liquid crystal display device. The pixel unit comprises: an array substrate; a color filter substrate; and a liquid crystal layer located between the array substrate and the color filter substrate. The pixel unit includes a displaying region and a non-displaying region in which a first electrode and a second electrode are formed on the array substrate and the color filter substrate respectively, and the rotation of molecules in the liquid crystal layer between the first electrode and the second electrode can be controlled by a vertical electrical field generated between the first electrode and the second electrode after energized to realize a normal black display mode, so that light leaking from the liquid crystal layer between the first electrode and the second electrode is prevented.

20 Claims, 5 Drawing Sheets

(51) Int. Cl.
*G02F 1/1362* (2006.01)
*G02F 1/1333* (2006.01)

(52) U.S. Cl.
CPC ............ *G02F1/136286* (2013.01); *G02F 2001/133388* (2013.01); *G02F 2001/134372* (2013.01); *G02F 2201/128* (2013.01); *G02F 2201/40* (2013.01); *G02F 2203/62* (2013.01)

(56) References Cited

U.S. PATENT DOCUMENTS

| 2006/0139542 | A1* | 6/2006 | Ando et al. | 349/130 |
|---|---|---|---|---|
| 2008/0123029 | A1* | 5/2008 | Ko et al. | 349/96 |
| 2009/0135342 | A1* | 5/2009 | Lee | 349/96 |
| 2010/0007593 | A1* | 1/2010 | Mori et al. | 345/94 |
| 2010/0014012 | A1* | 1/2010 | Irie et al. | 349/39 |
| 2010/0128189 | A1* | 5/2010 | Teranishi et al. | 349/33 |
| 2010/0283923 | A1* | 11/2010 | Kawakami | 349/5 |
| 2010/0330719 | A1* | 12/2010 | Chen et al. | 438/30 |

OTHER PUBLICATIONS

Second Chinese Office Action Appln. No. 201110080376.4; Dated Nov. 4, 2014.

Third Chinese Office Action Appln. No. 201110080376.4; Dated Feb. 27, 2015.

* cited by examiner (Prior Art)

PIXEL UNIT, METHOD FOR FABRICATING THE SAME AND LIQUID CRYSTAL DISPLAY DEVICE

BACKGROUND

Embodiments of the disclosed technology relate to a pixel unit, a liquid crystal display device, and a method for fabricating the same.

In the field of thin film transistor liquid crystal display (TFT-LCD) devices, the aperture ratio of a pixel unit is an important product index. The aperture ratio refers to a ratio of the area of a portion through which light can pass through in each of the pixel units exclusive of the wiring section and the transistor section (generally shielded by a black matrix) to a total area of each of the pixel units. If the pixel units have an increased aperture ratio, the light transmitting efficiency can be increased correspondingly. Therefore, the pixel unit with a high aperture ratio is important in terms of increasing resolution and luminance of the liquid crystal panel and decreasing power consumption thereof.

Figure 1:
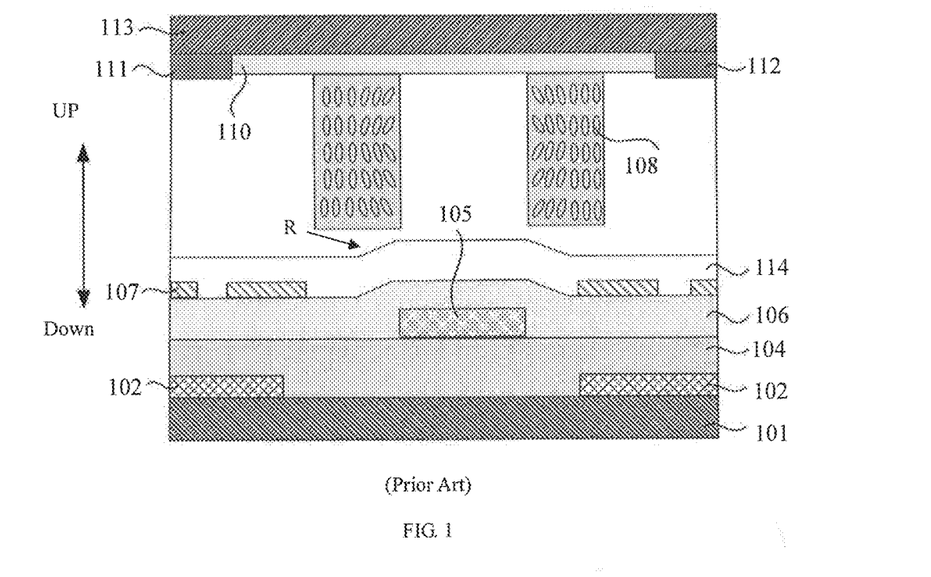
FIG. 1 is a cross-sectional diagram showing a configuration of a pixel unit in the prior art.

FIG. 1 is a cross-sectional diagram showing a configuration of a pixel unit in the prior art. As shown in the cross-sectional diagram, the pixel unit comprises an first substrate 101, a common electrode 102, a gate electrode (not shown), an insulating layer 104, a data line 105, a passivation layer 106, a pixel electrode 107, an orientation film 114, a liquid crystal layer 108, a green (G) color filter 111, a red (R) color filter 112 (and a green color filter which is not shown), a light-shielding film 110 and a second substrate 113 laminated in this order from top to down. During fabricating the pixel units, since an inclined angle phenomenon (as identified by an arrow R in the drawing) occurs above the data line of the pixel unit, in the black state of the pixel unit in display, liquid crystal molecules of the liquid crystal layer in a region on both sides of the data line 105 may deflect from a direction perpendicular to the array substrate, resulting in light leakage in this portion of the liquid crystal layer and thus affecting the contrast adversely. For purpose of shielding the light leaking from the region, generally, the width of the light-shielding film 110 above the data line 105 is increased so as to decrease the disadvantageous effect on the liquid crystal panel due to the light leakage from the liquid crystal layer.

However, the increase of the width of the light-shielding film 110 above the data line 105 results in decreasing of the aperture ratio of the pixel unit. For example, for one display panel with a size of 32 inches, if the light-shielding film 110 in the pixel unit is increased by 1 µm, then the aperture ratio of the pixel unit is decreased by 1%, and the transmittance rate of the liquid crystal panel is decreased significantly. Therefore, light leakage from the liquid crystal layer 106 suppresses increasing of the aperture ratio of the pixel unit.

SUMMARY

According to the first aspect of the disclosed technology, a pixel unit in a liquid crystal display device is provided. The pixel unit comprises: an array substrate; a color filter substrate; and a liquid crystal layer located between the array substrate and the color filter substrate, wherein the pixel unit includes a displaying region and a non-displaying region, in the non-displaying region a first electrode and a second electrode are formed on the array substrate and the color filter substrate respectively, the rotation of liquid crystal molecules in the liquid crystal layer between the first electrode and the second electrode can be controlled by a vertical electrical field generated between the first electrode and the second electrode after the first and second electrodes are energized to realize a normal black display mode, and light leakage from the liquid crystal layer between the first electrode and the second electrode is prevented.

According to the second aspect of the disclosed technology, a liquid crystal display device is provided. The liquid crystal display device comprises a plurality of pixel arranged in an array, and each pixel has the pixel unit as described above.

According to the third aspect of the disclosed technology, a method for manufacturing a liquid crystal display device is provided. The liquid crystal display device comprises a plurality of pixels arranged in an array, and each pixel comprises a displaying region and a non-displaying region. The method comprises: forming gate electrodes and first electrodes on an array substrate, the first electrodes being located in the non-displaying region of each pixel; forming an insulating layer, data lines, a passivation layer and pixel electrodes to obtain an array substrate unit, the pixel electrodes being located in the displaying region of each pixel; forming a light-shielding film, color filters and photo spacers on a color filter substrate; forming second electrodes on the color filter substrate to obtain a color filter substrate unit, the second electrodes being located in the non-displaying region of each pixel; and bonding the array substrate unit and the color filter substrate unit with a liquid crystal layer filled therebetween so that the first electrode on the array substrate and the second electrode on the color filter substrate unit are opposite to each other and the liquid crystal layer between the first electrode and the second electrode is operated in a normal black display mode after the first and second electrodes are energized.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Hereinafter, the embodiments of the disclosed technology will be described in detail with reference to the accompanying drawings so that the objects, technical solutions and advantages of the embodiments of the disclosed technology will become more apparent. It should be noted that the embodiments described below merely are a portion of but not all of the embodiments of the disclosed technology, and thus various modifications, combinations and alterations may be made on basis of the described embodiments without departing from the spirit and scope of the disclosed technology.

Figure 2:
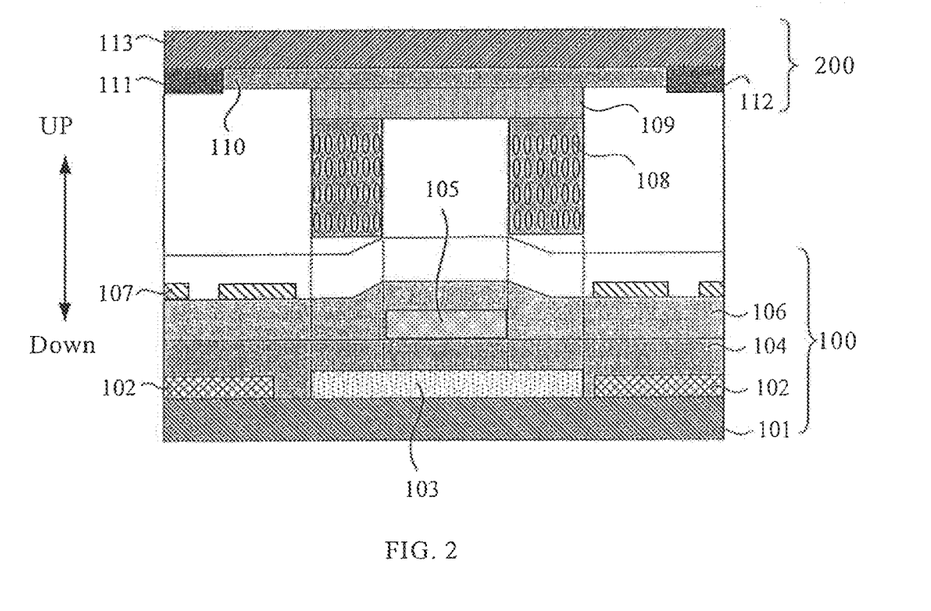
FIG. 2 is a cross-sectional diagram showing a configuration of a first embodiment of a pixel unit according to the disclosed technology.

FIG. 2 is a cross-sectional diagram showing a configuration of a first embodiment of a pixel unit according to the disclosed technology. This embodiment is directed to a liquid crystal panel comprising a plurality of pixels arranged in an array. Each of the pixels includes a displaying region and a non-displaying region, for example, located in a peripheral of the displaying region, and includes a data line and a gate line that define the pixel and a thin film transistor (TFT) used as a switch element. For example, a black matrix is provided in the non-displaying region so as to prevent light leakage from the region and the crosstalk between adjacent pixels. For purpose of increasing the aperture ratio of the pixels, it is desirable to increase the ratio of the displaying region in the pixel unit and decrease the ratio of the non-displaying region in the pixel unit correspondingly.

As shown in the cross-sectional diagram of FIG. 2, the pixel unit in this embodiment comprises an array substrate 100, a color filter substrate 200 and a liquid crystal 108 located between the array substrate 100 and the color filter substrate 200. In this embodiment, the array substrate 100 comprises a first substrate 101, gate lines and gate electrodes (not shown), common electrodes 102, an insulating layer 104, data lines 105, a passivation layer 106, pixel electrodes 107, and the color filter substrate 200 comprises a second substrate 113, green color filters 111, red color filters 112 and blue color filters (not shown) and a light-shielding film 110. The light-shielding film 110 is for example a part of the black matrix of the color filter substrate 200. Here, the pixel electrodes 107 are located in the displaying region of the each pixel for controlling the liquid crystal layer in the displaying region. The light-shielding film 110 is located in the non-displaying region.

In the light-leaking regions above the array substrate 100 and the color filter substrate 200, first electrodes 103 and second electrodes 109 are provided, respectively. The first electrodes 103 and the second electrodes 109 are not used to display and are located in the non-displaying region of each pixel. In this embodiment, the first electrodes 103 and the second electrodes 109 are disposed on the array substrate 100 and the color filter substrate 200 respectively, covering a region corresponding to the data lines 105 and the inclined angle regions on both sides of the data lines 105. The first electrodes 103 are provided on the array substrate 100 and in parallel with the first substrate 101. The second electrodes 109 are provided on the color filter substrate 200 and in parallel with the second substrate 200. The first electrodes 103 and the second electrodes 109 are disposed on both sides of the liquid crystal layer 108 respectively facing each other, and are connected with a voltage source. Since the first electrodes 103 and the second electrodes 109 are connected with the voltage source, or the first electrodes 103 or the second electrodes 109 are connected with a voltage source and the other are floated or grounded, a vertical electrical field is generated between a first electrode 103 and a corresponding second electrode 109. The field between the first electrode 103 and the corresponding second electrode 109 in each pixel is used to control the rotation state of the liquid crystal molecules in the intermediate liquid crystal layer 108 so that the liquid crystal molecules are arranged in a direction perpendicular to the light-shielding film 110 and in turn light is prevented from leaking in this region. As a result, light leakage from the liquid crystal layer 108 can be efficiently avoided without designing a large-sized light-shielding film 110; the restraint of the light leakage from the liquid crystal layer 108 upon the aperture ratio of the pixel unit can be decreased, and the displaying luminance or brightness of the pixel unit can be assured. That is, with the control of the first electrodes 103 and the second electrodes 109, the liquid crystal layer 108 between pairs of them is operated in a normal black display mode, acting as a black matrix.

For example, the first electrodes 103 and the gate electrodes can be made of a same metal layer, for example, by photolithograph, etching and the like in a same processes. The material of the metal layer is selected from the group consisting of Aluminum (Au), Molybdenum (Mo), Copper (Cu), Silver (Ag) and the like. The second electrodes 109 can be made of indium tin oxide (ITO), indium zinc oxide (IZO), or the other transparent conductive material. The first electrodes 103 and the second electrodes 109 have a thickness in a range from 20 nm to 100 nm, preferably, 40 nm. Furthermore, the first electrodes 103 and the second electrodes 109 are not necessarily positioned as shown in FIG. 2, as long as the first electrodes 103 and the second electrodes 109 are positioned on upper and lower sides of the liquid crystal layer 108 in pair so that the electric field generated between the first electrodes 103 and the second electrodes 109 can control the rotation state of the liquid crystal molecules in the liquid crystal layer 108 on both sides of the data lines 105 to prevent light leakage from the liquid crystal layer 108. For example, the voltage between the first electrodes 103 and the second electrodes 109 is set to be from 0.1V to 5V. In addition, the first electrodes 103 and the common electrodes 102 may be connected to a same voltage source. The voltage between the first electrodes 103 and the corresponding second electrodes 109 can be set to be in another range as long as the liquid crystal layer 108 is kept in an opaque state and the normal operation of the pixel unit is not affected.

In this embodiment, the liquid crystal molecules in the liquid crystal layer between the first electrodes and the second electrodes are arranged in a direction perpendicular to the light-shield film due to the electric field between the first electrodes and the second electrodes so as to prevent light leaking from the liquid crystal layer and keep the portion of the liquid crystal layer in a normal black display mode. It is advantageous for reducing the width of the light-shielding film and relaxing the restraint of the light leakage from the liquid crystal layer upon the aperture ratio of the pixel unit, so as to increase the aperture ratio of the pixel unit efficiently.

Figure 3:
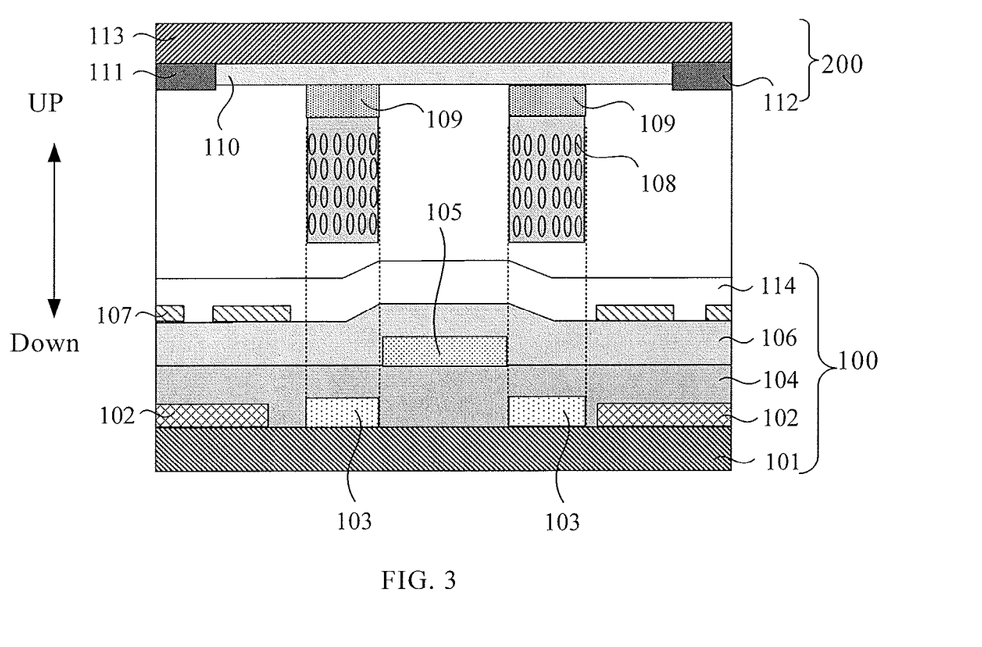
FIG. 3 is a cross-sectional diagram showing a configuration of a second embodiment of a pixel unit according to the disclosed technology.

FIG. 3 is a cross-sectional diagram showing a configuration of a second embodiment of a pixel unit according to the disclosed technology. This embodiment is directed to a liquid crystal panel comprising a plurality of pixels arranged in a matrix. As shown in the cross-sectional diagram of FIG. 3, in the pixel unit of this embodiment, both of the first electrode 103 and the second electrode 109 comprise separate strip electrodes which are located on upper and lower sides of the liquid crystal layer 108 in each of the pixel units, and the first electrode 103 and the second electrode 109 correspond to and face each other. The liquid crystal molecules in the liquid crystal layer between the first electrode 103 and the second electrode 109 are arranged in a direction perpendicular to the light-shielding film 110 due to the field generated between the first electrode 103 and the corresponding second electrode 109, so as to prevent light leaking from the liquid crystal layer 108. The projection of the first electrodes 103 and the second electrodes 109 from the color filter substrate 200 onto the array substrate 100 is located in the inclined angle regions located on both sides of the projection of the data lines 105 onto the array substrate 100. That is, in this embodiment, the first electrodes 103 are formed on the array substrate 100 in the regions corresponding to the both sides of the data lines 105, and the second electrodes 109 are formed on the color filter substrate 200 in the regions corresponding to the both sides of the data lines 105 in order to avoid an increased load of the power source due to a electrical field generated between the first electrodes 103 and the data lines 105 or that between the second electrodes 109 and the data lines 105, thus decreasing the power consumption of the pixel unit. The first electrodes 103 and the second electrodes 109 are connected with a voltage source respectively; or the first electrodes 103 or the second electrodes 109 are connected to a voltage source, and the other are floated or grounded. The corresponding liquid crystal layer between the first electrodes 103 and the second electrodes 109 is operated in the normal black display mode due to the electrical field generated between the first electrodes 103 and the second electrodes 109 after the first and second electrodes 103 and 109 are energized, acting as a black matrix.

Figure 4:
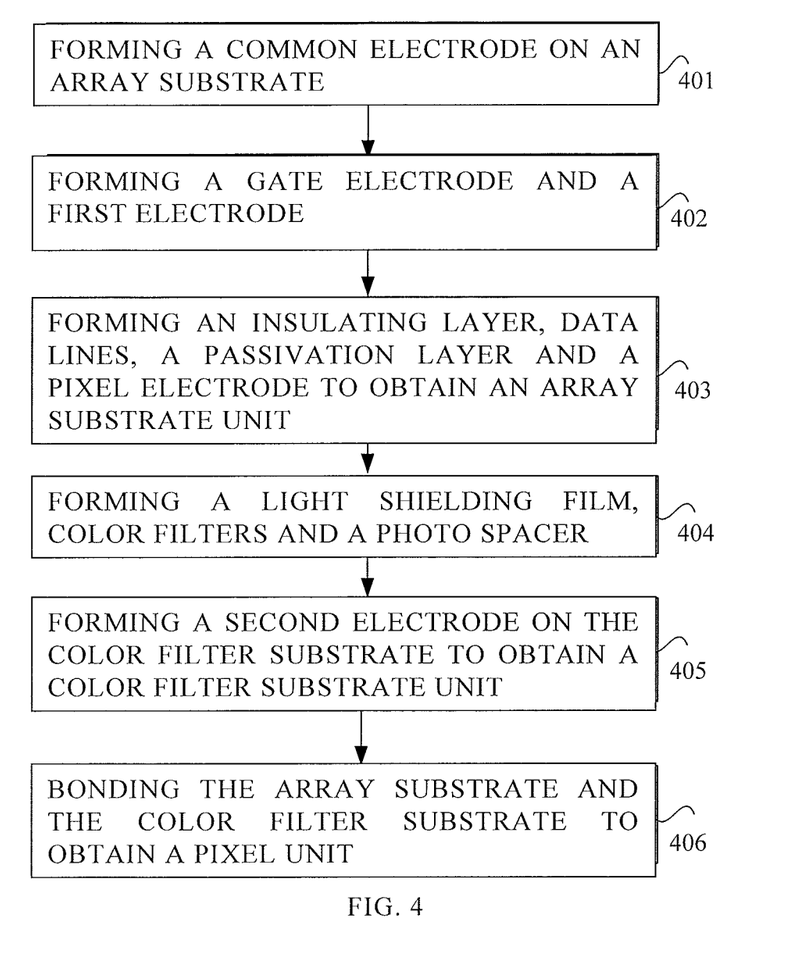
FIG. 4 is a flow diagram showing an embodiment of a method for manufacturing a pixel unit according to the disclosed technology.

In the following, an embodiment of a method for manufacturing the pixel unit according to the disclosed technology is described with reference to FIG. 4 and FIGS. 5A to 6B. As shown in FIG. 4, the steps 401 to 403 are processes for manufacturing the array substrate unit, and the steps 404 to 405 are processes for manufacturing the color filter substrate unit. The processes of the method for manufacturing the pixel unit in this embodiment comprise the following steps:

Step 401, forming common electrodes on an array substrate.

Figure 5A:
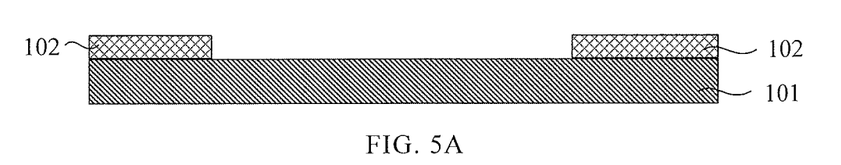
FIG. 5A is a cross-sectional diagram showing a first configuration of an array substrate unit according to this embodiment.

FIG. 5A is a cross-sectional diagram showing a first configuration of an array substrate unit according to this embodiment. As shown in FIG. 5A, in this step, a layer of transparent conductive material such as ITO, IZO or the like is deposited on the first substrate of the array substrate 100 by sputtering, thermal evaporation or the like, and common electrodes 102 are formed by a photolithograph process and an etching process on the transparent conductive material layer.

Step 402, forming gate electrodes and first electrodes on the array substrate.

Figure 5B:
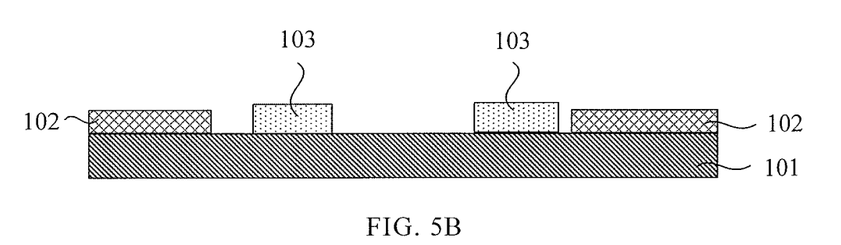
FIG. 5B is a cross-sectional diagram showing a second configuration of the array substrate unit according to this embodiment.

FIG. 5B is a cross-sectional diagram showing a second configuration of an array substrate unit according to this embodiment. As shown in FIG. 5B, in this step, the first electrodes 103 and the gate electrodes can be made of a same metal layer, for example, by processes of deposition, photolithograph, and etching. The purpose of forming the first electrodes 103 and the other conductive layer or lines by the same conductive layer in a same process is to form the first electrodes 103 without increasing the number of the photolithograph process or the other process, thus the production efficiency of the array substrate is not affect disadvantageously. For example, the material of the metal layer is selected from the group consisting of Aluminum (Au), Molybdenum (Mo), Copper (Cu), Silver (Ag) and the like. After the gate electrodes and the first electrodes 103 are formed by the photolithograph process and the etching process, and the process proceeds to the step 403.

Step 403, forming an insulating layer, data lines, a passivation layer and pixel electrodes to obtain an array substrate unit.

Figure 5C:
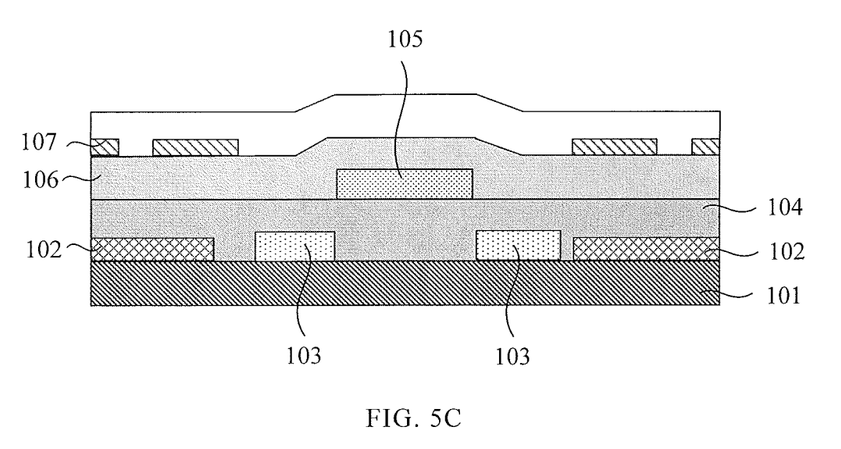
FIG. 5C is a cross-sectional diagram showing a third configuration of an array substrate unit according to this embodiment.

FIG. 5C is a cross-sectional diagram showing a third configuration of an array substrate unit according to this embodiment. As shown in FIG. 5C, in this step, firstly an insulating layer 104 is deposited on the array substrate 100 formed with the common electrodes 102, the gate electrodes, and the first electrodes 103, by physical vapor deposition (PVD), chemical vapor deposition (CVD) or the like. Subsequently, data lines 105, a passivation layer 106 and pixel electrodes 107 are formed on the insulating layer 104 to obtain the array substrate unit.

Figure 6A:
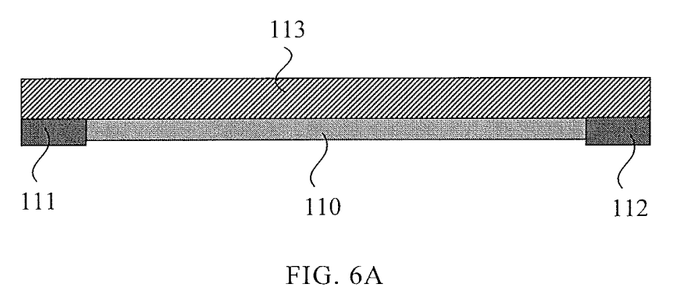
FIG. 6A is a cross-sectional diagram showing a first configuration of a color filter substrate unit according to this embodiment.

Step 404, forming a light-shielding film, color filters and photo spacers (PSs) on a color filter substrate;

FIG. 6A is a cross-sectional diagram showing a first configuration of a color filter substrate unit according to this embodiment. As shown in FIG. 6A, in this step, a light-shielding film 119, color filters and photo spacers are formed on a second substrate of the color filter substrate 200 in this order. The color filters comprise green color filters 111, red color filters 112, and blue color filters (not shown). After formation of the light-shielding film, the color filters and the photo spacer are formed, the process proceed to the step 405.

Step 405, forming second electrodes on the color filter substrate obtained after performing the above steps to obtain a color filter substrate unit.

Figure 6B:
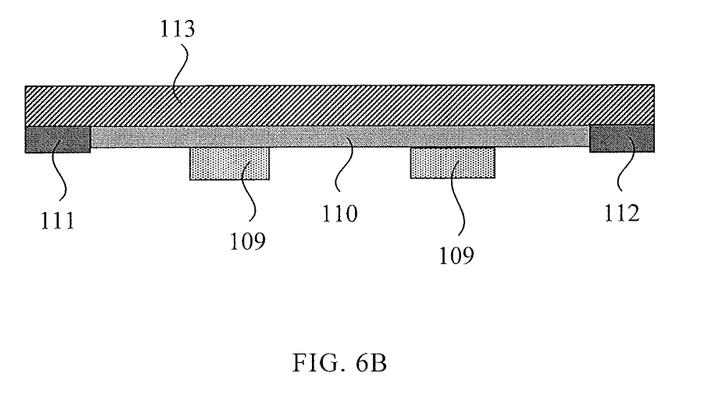
FIG. 6B is a cross-sectional diagram showing a second configuration of the color filter substrate unit according to this embodiment.

FIG. 6B is a cross-sectional diagram showing a second configuration of a color filter substrate unit according to this embodiment. As shown in FIG. 6B, in this step, a transparent conductive material layer is deposited on the color filter substrate 200 obtained after performing the above step 404, by sputtering, thermal evaporation and the like. The transparent conductive material used by the second electrode 109 can prevent the aperture ration of the pixel unit from being affected due to the shielding of the second electrodes 102, and may be ITO, IZO or the like. Next, after the second electrodes are formed by processes of photolithography and etching, the process proceed to the step 406.

Step 406, the array substrate unit and the color filter substrate unit are assembled to obtain the pixel unit.

After obtaining the array substrate unit by the steps 401 to 403 and obtaining the color filter substrate unit by the steps 404 to 405, an orientation film 114 is applied on each of the array substrate unit and the color filter substrate unit, and is oriented by a rubbing process. Next, a liquid crystal layer 108 is provided between the array substrate unit and the color filter substrate unit by one drop filling (ODF) process for example. The array substrate unit and the color filter substrate unit are assembled to face each other to obtain the pixel unit. The pixel unit in this embodiment can have a configuration as shown in FIG. 2 or FIG. 3.

In this embodiment, the array substrate unit is foamed firstly, and the color filter substrate unit is formed later. However, the sequence of forming the array substrate unit and the color filter substrate unit are not particularly limited, and the array substrate unit and the color filter substrate unit can be formed in parallel.

In this embodiment, the first electrodes and the second electrodes are formed on the array substrate unit and the color filter substrate unit respectively. After bonding together of the array substrate and the color filter substrate, the first electrodes and the second electrodes are formed on the upper and the lower sides of the liquid crystal layer respectively. The liquid crystal molecules in the liquid crystal layer between the first electrodes and the second electrodes are arranged in a direction perpendicular to the light-shielding film due to the electrical field between the first electrodes and the second electrodes, so that the liquid crystal layer is operated in a normal black display mode. As a result, light leakage from the liquid crystal layer in the region is prevented so as to reduce the width of the light-shielding film. Thus, the restraint of the light leaking from the liquid crystal layer onto improvement of the aperture ratio of the pixel unit is relaxed, and accordingly the aperture ratio of the pixel unit can be increased efficiently.

In the above embodiments, a planar field type LCD, in which common electrodes and pixel electrodes for controlling the orientation of the liquid crystal layer are formed on the array substrate simultaneously, is described as an example. In the example, the pixel electrodes 107 may have a comb-like shape, and can form a planar field with the underlying common electrodes 102. The pixel electrodes 107 and the common electrodes 102 can be reversed in position and the common electrodes have a comb-like shape in this case. However, the embodiments of the disclosed technology are not limited thereto, and can be applied to a vertical electrical field type LCD in which the common electrode controlling the orientation of the liquid crystal layer is formed on the color filter substrate.

It should be appreciated that the embodiments described above are intended to illustrate but not limit the disclosed technology. Although the disclosed technology has been described in detail herein with reference to the preferred embodiments, it should be understood by those skilled in the art that the disclosed technology can be modified and some of the technical features can be equivalently substituted without departing from the spirit and scope of the disclosed technology.

What is claimed is:

1. A pixel unit in a liquid crystal display device comprising: an array substrate; a color filter substrate; and a liquid crystal layer located between the array substrate and the color filter substrate, wherein the pixel unit includes a displaying region and a non-displaying region, in the non-displaying region a first electrode and a second electrode are formed on the array substrate and the color filter substrate respectively, the rotation of liquid crystal molecules in the liquid crystal layer between the first electrode and the second electrode is controlled by a vertical field generated between the first electrode and the second electrode, after the first and second electrodes are energized, to realize a normal black display mode, and light leakage from the liquid crystal layer between the first and the second electrode is prevented; and wherein the first electrode and the second electrode are completely provided in the non-displaying region, so that no portions of the first electrode are provided outside the non-displaying region and no portions of the second electrode are provided outside the non-displaying region.

2. The pixel unit according to claim 1, wherein the first electrode and the second electrode are disposed on the array substrate and the color filter substrate respectively in a region covering a data line and both sides of the data line.

3. The pixel unit according to claim 1, wherein the first electrode and the second electrode comprise separate strip electrodes, and are disposed on the array substrate and the color filter substrate in regions corresponding to both sides of a data line.

4. The pixel unit according to claim 1, wherein the first electrode and the second electrode have a thickness in a range from 20 nm to 100 nm.

5. The pixel unit according to claim 1, wherein a voltage difference applied between the first electrode and the second electrode is between 0.1V to 5V after energization.

6. The pixel unit according to claim 1, wherein the material of the first electrode is selected from the group consisting of Aluminum, Molybdenum, Copper and Silver; and
the material of the second electrode is selected from the group consisting of Indium Tin oxide and Indium zinc oxide.

7. The pixel unit according to claim 1, wherein, in the displaying region, a pixel electrode is formed on the array substrate for controlling the liquid crystal layer corresponding to the displaying region for displaying.

8. The pixel unit according to claim 7, wherein, in the displaying region, a common electrode is formed on the array substrate, and an electrical field generated between the pixel electrode and the common electrode can be used to control the liquid crystal layer corresponding the displaying region for displaying.

9. A liquid crystal displaying device comprising a plurality of pixels arranged in an array, each pixel having the pixel unit according to claim 1.

10. The liquid crystal displaying device according to claim 9, wherein the first electrode and the second electrode are disposed on the array substrate and the color filter substrate respectively in a region covering a data line and both sides of the data line.

11. The liquid crystal displaying device according to claim 9, wherein the first electrode and the second electrode are discrete electrodes, and are disposed on the array substrate and the color filter substrate in regions corresponding to both sides of a data line.

12. The liquid crystal displaying device according to claim 9, wherein the first electrode and the second electrode have a thickness in a range from 20 nm to 100 nm.

13. The liquid crystal displaying device according to claim 9, wherein a voltage difference applied between the first electrode and the second electrode is between 0.1V to 5V after energization.

14. The liquid crystal displaying device according to claim 9, wherein the material of the first electrode is selected from the group consisting of aluminum, molybdenum, copper and silver; and
the material of the second electrode is selected from the group consisting of Indium Tin oxide and Indium zinc oxide.

15. The liquid crystal displaying device according to claim 9, wherein, in the displaying region, a pixel electrode is formed on the array substrate for controlling the liquid crystal layer corresponding to the displaying region for displaying.

16. The liquid crystal displaying device according to claim 15, wherein, in the displaying region, a common electrode is formed on the array substrate, and an electrical field generated between the pixel electrode and the common electrode can be used to control the liquid crystal layer corresponding the displaying region for displaying.

17. A method for manufacturing a liquid crystal display device, the liquid crystal display device comprising a plurality of pixels arranged in an array, each pixel comprising a displaying region and a non-displaying region, the method comprising:
forming gate electrodes and first electrodes on an array substrate, the first electrodes being located in the non-displaying region of each pixel;

forming an insulating layer, data lines, a passivation layer and pixel electrodes on the array substrate, the pixel electrodes being located in the displaying region of each pixel;

forming a light-shielding film, color filters and photo spacers on a color filter substrate;

forming second electrodes on the color filter substrate the second electrodes being located in the non-displaying region of each pixel; and bonding the array substrate and the color filter substrate with a liquid crystal layer filled there between so that the first electrode on the array substrate and the second electrode on the color filter substrate unit are opposite to each other and the liquid crystal layer between the first electrode and the second electrode is operated in a normal black display mode after the first and second electrodes are energized, wherein the first electrode and the second electrode are completely provided in the non-displaying region, so that no portions of the first are provided outside the non-displaying region and no portions of the second electrode are provided outside the non-displaying region.

18. The method according to claim 17, wherein forming the gate electrodes and the first electrodes on the array substrate comprises:

the first electrodes and the gate electrodes on the array substrate are made of the same metal layer by processes of photolithograph and etching.

19. The method according to claim 17, wherein forming the second electrodes on the color filter substrate comprises:

forming a transparent conductive material layer on the color filter substrate on which the light-shielding film, the color filters and the photo spacers are disposed, and forming the second electrodes by performing processes of photolithograph and etching onto the transparent conductive material layer.

20. The method according to claim 17, wherein common electrodes are formed on the array substrate in a displaying region of each pixel.

* * * * *